Patented Aug. 8, 1944

2,355,402

UNITED STATES PATENT OFFICE 2,355,402

RESINOUS PRODUCTS

Sidney Sussman, Moorestown, N. J., assignor to The Permutit Company, New York, N. Y., a corporation of Delaware No Drawing. Application April 12, 1941,
Serial No. 388,273

18 Claims. (Cl. 210—24)

This invention relates to resinous products, the preparation thereof, and a method of using certain of these products for removing acid from liquids.

In the water conditioning field and related arts, it is frequently desirable to provide an economical way of removing acid from liquids. For example, hydrogen exchanging zeolitic materials have been developed for use in treating water containing small amounts of dissolved salts. These zeolitic materials remove the metallic cations of the salts from the water in exchange for hydrogen, thus leaving in the water the acids corresponding to the original salts.

Various materials have been proposed for removing such acids as these from water, and are known as anion exchange products or anion absorbing products. Whether these materials actually remove the molecular acid from the water or remove simply the anions of the acid in exchange for hydroxyl ions is not definitely known. This is also true with respect to products of my invention, and, therefore, when the terms "anion exchanger" or "anion exchange product" are used herein, they are used in their broad sense and intended to cover a material that may operate in either way.

An efficient anion exchange product should be relatively insoluble in water, dilute acids or dilute alkalies, capable of being regenerated with a solution of a base, and have physical properties that permit use of the material in the form of a bed of granules.

One object of this invention is to provide an insoluble resinous product that may be used repeatedly for removing acid from liquids with intermediate regenerations.

A further object is the provision of intermediate resinous products that may be used to prepare anion exchangers.

Another object is the provision of economical methods of preparing such resinous products.

A further object is the provision of a method of treating liquids with anion exchangers of my invention by alternately bringing the product into contact with an acid containing liquid, and regenerating the product with a basic solution.

I have discovered that insoluble resinous products suitable for use as anion exchangers may be prepared by condensing an aldehyde with a nitroparaffin and then reducing the condensation product to produce an amino resin. In order to obtain relatively insoluble products, the condensation reaction may be carried out under conditions producing a resinous product. The usual condensation reaction between an aldehyde and a nitroparaffin does not result in a resin but produces a definite compound, usually crystalline and having a definite melting point. The usual condensation reactions between aldehydes and nitroparaffins may be summarized by the following general equations.

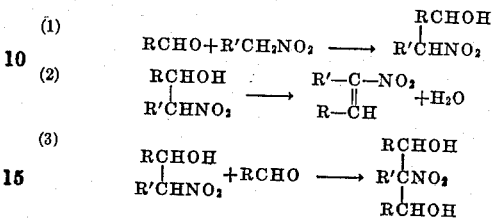

By controlling the conditions of reaction, however, I am able to obtain a condensation product of dark color and indefinite melting point that has the properties of a resin. Although I do not wish to be limited by any theory of reaction, I believe that such a resinous condensation product is obtained according to the following general equation:

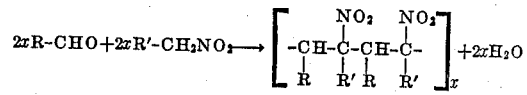

Any suitable nitroparaffin may be used for this purpose, either saturated or unsaturated and containing one or more nitro-groups. Suitable materials include nitromethane, nitroethane, 1-nitropropane, 1-nitrobutane and 1-nitro 2-methylpropane. In general, the nitroparaffins low in the series, such as nitromethane and nitroethane, and containing the linkage —CH$_2$—NO$_2$ are preferred because the product will then contain a higher percentage of nitrogen than if the nitroparaffins of higher molecular weight are used.

The nitroparaffin may be condensed with various aldehydes, either aliphatic or aromatic, such as formaldehyde, paraformaldehyde, acetaldehyde, or benzaldehyde. However, I prefer to use an aldehyde, such as furfural or acrolein, which contains a nucleus that permits polymerization. The term "nucleus" is used to include one or more groups or radicals, either aliphatic, aromatic, or combinations thereof. An aldehyde of this type that produces a certain amount of polymerization during the preparation of the products results in a very stable and insoluble product.

The aldehyde and nitroparaffin may be reacted in varying proportions, although equimolecular proportions are most efficient for utilization of the reagents. In order to obtain suitable condensation of the aldehyde and nitroparaffin, it is necessary to employ a basic catalyst, although this material may be selected from a wide range of substances. Mild basic catalysts such as the alkaline earth oxides or hydroxides are particularly satisfactory, but the alkali metal hydroxides or various aliphatic or aromatic amines, such as pyridine, piperidine, ethyl amine, or the like may also be used.

In carrying out the condensation reaction, the aldehyde, nitroparaffin and basic catalyst may be simply mixed together. The mixed ingredients may be allowed to stand without any heating or cooling for as long as is necessary to produce a pasty mass, which may vary from a few hours to several weeks. Heat may be applied, if necessary, and the temperature of the reaction may vary within rather wide limits. However, if an aldehyde containing a nucleus that polymerizes is used, I prefer to keep the temperature of reaction at least below about 100° C. and even below 50 to 60° C. to prevent substantial polymerization of this nucleus before the condensation reaction actually takes place between the aldehyde and the nitroparaffin.

After the resinous condensation product is obtained, this product is then treated with a reducing agent to reduce the nitro groups to amino groups. For this purpose, any suitable reducing agent that is capable of reducing nitro compounds to amino compounds may be used.

When an aldehyde containing a nucleus that polymerizes, such as furfural, is employed, I prefer to carry out the reduction at a relatively high temperature, or in the presence of a strong acid, or both, in order to obtain polymerization of the furane or other nucleus simultaneously with the reduction of the nitro groups. This renders the product much more water insoluble and more stable. Various reducing agents, such as stannous chloride in hydrochloric acid, various metals and acids that produce nascent hydrogen, or a catalytic hydrogenation consisting of a treatment with hydrogen at an elevated temperature and under pressure in the presence of a catalyst may be employed.

When an aldehyde is used containing a nucleus that polymerizes, however, it is possible to prepare a product suitable for water conditioning without forming a resinous condensation product in the first reaction. Such a non-resinous condensation product must, of course, be polymerized before, during or after the reduction in order to obtain a water insoluble product.

The final reduced resinous condensation product, which is generally dark brown or black in color, may be washed free of reducing agent, if necessary, and treated with a suitable basic solution to make it ready for use as an anion exchange product.

In order that my invention may be more completely understood, the following examples of the preparation of products according to this invention are given. In these examples, the ability of the products to remove acid from liquids is given in terms of milliequivalents of chloride ions removed from a given strength of hydrochloric acid by each gram of product. The testing of the products to determine this chloride ion removal ability is carried out as follows:

The product to be tested is first regenerated for one hour or more, with an excess of 14% ammonium hydroxide, then washed until the washings give only a faint pick color with phenolphthalein, and air dried. A weighed portion of this air dried product is placed in a flask with a measured volume of hydrochloric acid of known strength. After shaking for five hours, an aliquot of the supernatant liquid is drawn off, neutralized and titrated with a standard silver nitrate solution to determine the amount of chloride removed from the original volume of hydrochloric acid. This result is then computed in terms of milliequivalents of chloride ions per gram of oven dried product, after determining the moisture content of the air dried material.

Such a test gives an accurate measure of the actual ability of the product to exchange anions or absorb acids, and does not include any neutralization of acid by regenerant that may adhere to or be absorbed by the exchange product.

It has also been found that in general anion exchangers have different capacities for removing acid from liquids with different strengths of acid. The chloride ion removal ability of some of the products in the examples, therefore, is given for more than one strength of acid.

*Example I.*—26.7 kilograms of 1-nitropropane and 28.8 kilograms of furfural are well mixed with 5 kilgrams of calcium oxide and allowed to stand at room temperature for two weeks. The resultant thick pasty mass may then be reduced by heating it at a temperature of about 100° C. with 50 kilograms of stannous chloride dihydrate and an excess of concentrated hydrochloric acid for three hours. The reduced produce is a black water insoluble resin and may be washed, and then regenerated with a solution of a base such as a 14% ammonium hydroxide solution. Each gram of this product was found to remove 0.45 milliequivalent of chloride ions, and 0.19 milliequivalent of chloride ions when the final chloride ion concentrations were 44 and 9 milliequivalents per liter, respectively.

*Example II.*—48 kilograms of furfural, 45 kilograms of 1-nitropropane and 2 kilograms of sodium hydroxide are heated together in a decanting apparatus using toluene as a water carrier. After heating for several hours, the reaction mass may be evaporated substantially to dryness on a water bath, and the resinous residue then reduced with stannous chloride and hydrochloric acid as described in Example I. The reduced resin after washing and regenerating was found to remove 0.19 milliequivalent of chloride ions per gram from a solution, the final chloride ion concentration of which was 47 milliequivalents per liter.

When a relatively strong catalyst, such as sodium hydroxide, is employed, it is usually necessary to heat the aldehyde and nitroparaffin, or provide special means for removing water from the reaction, or both, in order to produce a resinous condensation product as distinguished from the ordinary monomeric product.

*Example III.*—48 kilograms of furfural, 30.5 kilograms of nitromethane and 1.8 kilograms of calcium hydroxide are mixed together and allowed to stand at room temperature for three weeks. The black paste thus formed may then be reduced by heating with 226 kilograms of $SnCl_2 \cdot 2H_2O$ and 300 liters of concentrated hydrochloric acid. The hard black resin thus obtained is washed, regenerated and tested for its ability to remove acid from liquids. This product was found to remove 0.91 milliequivalent of chloride ions per gram, and 0.53 milliequivalent of chloride ions per gram when the final chloride ion concentrations were 33 and 7.5 milliequivalents per liter, respectively.

Example IV.—48 kilograms of furfural, 30.5 kilograms of nitromethane and 1.8 kilograms of calcium hydroxide are stirred together for eight hours maintaining the temperature during that time at 40–45° C. The resinous product thus obtained may then be reduced by heating with stannous chloride and concentrated hydrochloric acid as in Example III. After the washing and regeneration, this product was found to remove 0.44 milliequivalent of chloride ions per gram, and 0.13 milliequivalent of chloride ions per gram when the final chloride ion concentrations were 43 and 9 milliequivalents per liter, respectively.

Example V.—30.5 kilograms of nitromethane, 48 kilograms of furfural, and 100 liters of methanol were cooled in a freezing mixture. While stirring, a solution of 21 kilograms sodium hydroxide in 520 liters water was added at such a rate that the temperature was kept at 10–15° C. After fifteen minutes standing about 350 liters of water and cracked ice were added. The solution was then added to a solution of 100 liters of concentrated hydrochloric acid in 150 liters of water. The yellow crystalline precipitate of furfurylidene nitromethane which formed was filtered off and washed. After recrystallization from ethanol, this product had a melting point of 72–73° C.

28.5 kilograms of furfurylidene nitromethane was reduced with 225 kilograms of stannous chloride and 300 liters concentrated hydrochloric acid. Upon addition of the acid, a very vigorous reaction took place accompanied by the formation of a very dark brown color. The mixture was kept at 90° C. for about 6 hours. The reduction product was thrown out of solution by dilution with water and, after washing, was regenerated with 14% ammonia solution and washed. The product removed 0.31 milliequivalent of chloride ion per gram with a final chloride ion concentration of 8.25 milliequivalents per liter, and 0.69 milliequivalent per gram with a final chloride ion concentration of 36.5 milliequivalents per liter.

Reduced resin products of my invention may be used to good advantage in a cyclic process for removing acid from liquids in which the product, preferably in a finely divided form, is alternately regenerated with a dilute solution of a base, and brought into contact with the liquid containing the acid to be removed.

One convenient manner of carrying out such a cyclic process is to break the resin up into granules of a suitable size or range of sizes such as 10 to 40 mesh. A bed of this granular product may then be formed in a suitable container, and the liquid to be treated can be flowed through this bed. After the acid removing ability of the granular resin product has become depleted, the flow of liquid is stopped and a solution of a base is introduced into the bed to regenerate the product. The flow of liquid to be treated can be resumed after the product is regenerated and washed.

Other methods of using the products of my invention may, of course, be employed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A substantially water insoluble resin product comprising a reduced condensation product of about equimolecular proportions of an aldehyde and a nitroparaffin condensed with dehydration at a low temperature and with a basic catalyst.

2. A substantially water insoluble resin product comprising a reduced polymerized condensation product of about equimolecular proportions of an aldehyde containing a nucleus that permits polymerization and a nitroparaffin.

3. A substantially water insoluble resin product comprising a reduced condensation product of about equimolecular proportions of an aldehyde and nitromethane condensed with dehydration at a low temperature with a basic catalyst.

4. A substantially water insoluble resin product comprising a reduced polymerized condensation product of about equimolecular proportions of furfural and a nitroparaffin.

5. As a new composition of matter, a condensation product of about equimolecular proportions of furfural and a nitroparaffin, said product having the properties of a resin.

6. As a new composition of matter, a condensation product of about equimolecular proportions furfural and a nitroparaffin prepared with dehydration at a low temperature with a mild basic catalyst to produce resinification without substantial polymerization of the furane nucleus of said furfural.

7. A substantially water insoluble anion exchange product comprising a resinous product prepared by condensing with dehydration an aldehyde containing a nucleus that permits polymerization with a nitroparaffin to produce a resinous product, and reducing said product under conditions causing polymerization of said nucleus.

8. A substantially water insoluble anion exchange product comprising a resin prepared by condensing furfural with a nitroparaffin with dehydration at a low temperature with a mild basic catalyst to produce resinification without substantial polymerization of the furane nucleus, and reducing the resinous product under conditions causing polymerization of said furane nucleus.

9. A method of preparing a resinous material comprising condensing about equimolecular proportions of an aldehyde with a nitroparaffin at a low temperature and with a mild basic catalyst to form a resinous product, and reducing said resinous product.

10. A method of preparing an anion exchange material comprising condensing about equimolecular proportions of an aldehyde with a nitroparaffin at a low temperature and with a mild basic catalyst to form a resinous product, reducing said resinous product, and treating the reduced product with a dilute solution of a base.

11. A method of preparing a resinous condensation product comprising reacting about equimolecular proportions of furfural with a nitroparaffin at a low temperature to eliminate water and form a resinous product without substantial polymerization of the furane nucleus of said furfural.

12. A method of preparing a water insoluble product comprising condensing about equimolecular proportions of an aldehyde containing a nucleus that permits polymerization with a nitroparaffin to eliminate water and form a resinous product without substantial polymerization of said nucleus, and reducing said resinous product under conditions producing polymerization of said nucleus.

13. A method of preparing a water insoluble product comprising condensing about equimolecular proportions of furfural with a nitroparaffin to eliminate water and form a resinous product without substantial polymerization of the furfural, and reducing said resinous product under conditions producing polymerization of the furane nucleus in said product.

14. A method of preparing an anion exchange product comprising condensing approximately equimolecular proportions of furfural with a nitroparaffin at a low temperature in the presence of a mild basic catalyst, reducing the reaction product to produce simultaneous polymerization thereof, and treating the reduced product with a solution of a base.

15. A method of removing acid from a liquid comprising bringing said liquid into contact with an anion exchanger comprising a substantially water insoluble reduced resinous condensation product of an aldehyde and a nitroparaffin, separating the liquid and exchange product, and thereafter regenerating said product with a solution of a base.

16. A cyclic process of removing acid from a liquid comprising alternately subjecting quantities of said liquid to contact with an anion exchanger comprising a substantially water insoluble reduced resinous condensation product of an aldehyde containing a nucleus that permits polymerization, and a nitroparaffin, and regenerating the product with an alkaline solution.

17. A cyclic process of removing acid from a liquid comprising alternately subjecting quantities of said liquid to contact with a substantially water insoluble reduced and polymerized resinous condensation product of furfural and a nitroparaffin, and regenerating the product with an alkaline solution.

18. A cyclic process of removing acid from a liquid comprising alternately subjecting quantities of said liquid to contact with a substantially water insoluble resin prepared by condensing an aldehyde containing a nucleus that permits polymerization with a nitroparaffin in the presence of a mild basic catalyst to produce a resinous condensation product without substantial polymerization of the aldehyde nucleus, and reducing said resinous condensation product under conditions that produce simultaneous polymerization of said nucleus; and regenerating said resin with an alkaline solution.

SIDNEY SUSSMAN.